2,716,078
Patented Aug. 23, 1955

2,716,078

METHOD FOR TREATING ACTIVATED MANGANESE DIOXIDE

Jay Y. Welsh, Hamden, Conn., assignor to Olin Mathieson Chemical Corporation, a corporation of Virginia No Drawing. Application March 24, 1953, Serial No. 344,455

6 Claims. (Cl. 136—139)

This invention relates to a method of stabilizing activated manganese dioxide to improve the delayed service characteristics (shelf life) of a dry cell in which it is used as a depolarizer without adversely affecting the capacity of such cell.

Certain activated manganese dioxides produce dry cells which have greater capacity than similar cells in which the depolarizer is formed of natural manganese dioxide ores. These include manganese dioxides made electrolytically, those prepared by oxidation of manganous hydroxide in the presence of an alkaline solution, and material produced by reduction of potassium permanganate. The use of these activated manganese dioxides as depolarizers in commercial cells has not been feasible, however, because the material rapidly deteriorates when stored. To be of any value, a dry cell must be capable of being stored on a dealer's shelf for a certain period of time, and then functioning substantially as well as a freshly made cell when put in use.

These activated manganese dioxides generally consist predominately of gamma, delta or epsilon crystal modifications. This has been ascertained by the lines appearing on X-ray or electron diffraction patterns of such materials.

I have found that such activated manganese dioxides, which as stated are lacking in stability, can be stabilized without substantial loss of activity by treating the material in an aqueous solution of an electrolyte for a period of time that will result in conversion of a part of the manganese dioxide to the cryptomelane crystal modification. The treatment must be stopped prior to complete conversion to the cryptomelane crystal structures, or a loss in capacity will result.

Various electrolyte solutions may be employed. Thus, I may use singly or in combination, dilute hydrochloric acid, ammonium chloride, zinc chloride, potassium chloride, sodium chloride or other chloride salts, neutral or acidic in character. The electrolyte solution which is to be used in the cell in which the depolarization material is used, may advantageously be employed in the treatment. Thus a solution of 15 percent to 25 percent ammonium chloride and 15 percent to 35 percent zinc chloride may be used. Specific solutions which have given satisfactory results contained 25 percent by weight of ammonium chloride and 34 percent by weight of zinc chloride, and 26 percent ammonium chloride and 21 percent zinc chloride. I preferably employ some zinc chloride in the solution, at least about 5% by weight.

The time of treatment and the temperature may be widely varied, increase in temperature resulting in a shortening of the time period. Thus I may employ an aqueous solution containing 20 percent of zinc chloride and maintain it at a temperature of 90° C. for a period of 48 to 72 hours. The period of time may be shortened by carrying out the process at elevated temperatures. Thus, the process may be performed in an autoclave at a temperature of 150° C. with a one hour treatment. The time and temperature should be correlated to produce substantially the same extent of re-crystallization as would occur if the manganese dioxide were allowed to remain in contact with the electrolyte for a period of one year at room temperature.

Following the treatment, the manganese dioxide may be drained free of excess solution and incorporated while in a moist condition into the depolarizing mixture. However, it is also possible to subject the manganese dioxide material, after separation from the excess solution, to drying at relatively low temperatures. Subsequently, the dried material is incorporated into a depolarizing mix.

When manganese dioxide products are re-crystallized as described above with use of a zinc chloride electrolyte, the re-crystallization process takes place smoothly with the resulting products having outstanding characteristics for use as depolarizer in dry cells. The electrical characteristics are those of an activated manganese dioxide depolarizer, that is, the capacity of dry cells in which such material is incorporated as depolarizer is substantially higher than can be obtained with any natural manganese dioxide ore. Furthermore, the high capacity is substantially maintained even during extended periods of storage of the assembled dry cells.

The excellent depolarizing properties of such manganese dioxide products is to be at least in part attributed to the presence of zinc in the resulting manganese dioxide. It is considered that the presence of zinc ions in the crystal lattice of the manganese dioxide improves the depolarizing action by facilitating the formation of heterolite during the discharge action of the cell. This is the cell discharge mechanism which is most favored for the attainment of greatest efficiency and service.

The change in crystal structure of activated manganese dioxide treated as herein described, as evidenced by the electron diffraction, may be summarized as follows:

| Original Crystal Structure | Intermediate Crystal Structure X | Final Crystal Structure |
|---|---|---|
| Delta, diffraction lines—broad, diffused, 2.4, 2.1, 1.4 A°. | Epsilon — very sharp diffraction lines 2.4, 1.4 A°. | Cryptomelane, sharp diffraction lines 7, 5, 3.2, 2.4, 2.1, 1.82, 1.64, 1.54, 1.41, 1.38, 1.35, 1.30 A°. |
| Cryptomelane, diffused or sharp diffraction lines. | | Sharp diffraction lines and crystal growth. |
| Gamma—broad or sharp diffraction lines—2.4, 2.1, 1.64, 1.41 or 1.38 A°. | Traces of cryptomelane. | Trace to strong cryptomelane phase depending upon stability of initial gamma $MnO_2$. |

The improvements in delayed capacity resulting from the process may be seen from the following results. Manganese dioxide consisting of delta crystal structure (light hydrate) was used in the manufacture of dry cells with light duty core size and submitted to a heavy industrial capacity test. In this test, the cell is discharged through a resistance of 4 ohms for four minutes out of every fifteen minutes for eight hours of each day. The cells containing the control or untreated material lasted for 611 minutes in a freshly made cell and for 240 minutes when tested after six months. Similar cells in which the manganese dioxide was treated in a 20% zinc chloride solution for 72 hours at 90° C. gave the following results: initial 603 minutes, 6 months, 544 minutes.

When the same cells were submitted to a light, industrial capacity test, one in which the cell is discharged through 4 ohms resistance 4 minutes out of every hour, eight hours a day, the values for the cells using the untreated material were initial 672 minutes, after six months less than 32 minutes and for the cells using the treated material, initial 749 minutes, after six months 706 minutes.

Similar tests were made on an ore containing gamma and cryptomelane crystal structure (Western Electro Ore #34) with the following results. The ore, untreated, was used in preparation of control cells which were submitted to the light industrial capacity test with the following result: initial 1183, after six months 627 minutes. One batch of this ore was treated with a 20% zinc chloride solution for 72 hours at 90° C. and used in the manufacture of cells. These cells, when submitted to the light industrial capacity test, gave the following results: initial 1048 minutes, after six months 1054 minutes. Cells made with some of the same manganese dioxide treated with 20% ammonium chloride solution for 72 hours at 90° C., when submitted to the same test, gave the following results: initial 1164 minutes, after six months 1200 minutes.

In another test, a manganese dioxide product consisting largely of the delta crystal modification was treated for 24 hours at 90° C. with a solution containing 20 percent by weight of ammonium chloride. Cells were assembled using the untreated material as depolarizer and another series using the treated material as depolarizer. Tests of capacity were made by the light industrial test immediately after assembly of the cells and after storage of the cells for six months. The following data resulted:

| Material | Initial, minutes | After 6 months, minutes |
|---|---|---|
| Untreated—delta | 760 | 490 |
| Treated | 710 | 720 |

I claim:

1. The method of stabilizing activated manganese dioxide to increase its stability when used as the depolarizer of a dry cell which comprises subjecting the material to a temperature of substantially 90° C. to 150° C. for a period varying from 72 hours to 1 hour, the period of time decreasing as the temperature increases in an aqueous solution containing zinc chloride.

2. The method of stabilizing activated manganese dioxide to increase its stability when used as the depolarizer of a dry cell which comprises subjecting the material to a temperature of substantially 90° C. to 150° C. for a period varying from 72 hours to 1 hour, the period of time decreasing as the temperature increases in an aqueous solution of a chloride.

3. The method of stabilizing activated manganese dioxide to increase its stability when used as the depolarizer of a dry cell which comprises subjecting the material to a temperature of substantially 90° C. to 150° C. for a period varying from 72 hours to 1 hour, the period of time decreasing as the temperature increases in an aqueous solution of ammonium chloride and zinc chloride.

4. The method of stabilizing activated manganese dioxide to increase its stability when used as the depolarizer of a dry cell which comprises subjecting the material to an elevated temperature of at least 90° C. for a period of at least 1 hour in an aqueous solution of an electrolyte containing a chloride until a substantial proportion of the material has been converted to the cryptomelane crystal form.

5. The method of stabilizing activated manganese dioxide to increase its stability when used as the depolarizer of a dry cell which comprises subjecting the material to an elevated temperature of at least 90° C. for a period of at least 1 hour in an aqueous solution containing zinc chloride until a substantial proportion of the material has been converted to the cryptomelane crystal form.

6. The method of stabilizing activated manganese dioxide to increase its stability when used as the depolarizer of a dry cell which comprises subjecting an aqueous solution of an electrolyte including a chloride and containing activated manganese dioxide at a temperature of substantially 90° C. for a period of from 48 to 72 hours.

References Cited in the file of this patent

FOREIGN PATENTS

| 500,806 | Great Britain | Feb. 16, 1939 |
| 124,439 | Austria | Sept. 10, 1931 |